United States Patent [19]

Sadler

[11] Patent Number: 4,692,128
[45] Date of Patent: Sep. 8, 1987

[54] CONTINUOUSLY VARIABLE TRANSMISSION PULLEY

[75] Inventor: Thomas H. Sadler, Highlands Ranch, Colo.

[73] Assignee: Manville Corporation, Denver, Colo.

[21] Appl. No.: 878,547

[22] Filed: Jun. 25, 1986

[51] Int. Cl.⁴ .......................................... F16H 55/52
[52] U.S. Cl. ................................................ 474/8
[58] Field of Search ............... 474/8, 47, 69, 77, 95, 474/902, 903, 152, 158, 161, 162; 523/156, 157; 524/440

[56] References Cited

U.S. PATENT DOCUMENTS

| 824,115 | 6/1906 | Hearttagen | 474/8 |
| 1,637,402 | 8/1927 | Abbott | 474/8 X |
| 2,426,421 | 8/1947 | Tilden et al. | 523/157 X |
| 4,352,750 | 10/1982 | Eschen | 523/156 |

FOREIGN PATENT DOCUMENTS 0185259 7/1922 United Kingdom .................. 474/8

Primary Examiner—Stephen J. Novosad
Assistant Examiner—Thuy M. Bui
Attorney, Agent, or Firm—John D. Lister; Timothy R. Schulte; Gregory A. Evearitt

[57] ABSTRACT

A pulley construction for use in a continuously variable power transmission arrangement. The conical working surfaces of the drive pulleys and the driven pulleys are comprised of removable segments formed of material which is relatively erodable so that the conical pulley surfaces will wear away before the drive belt. The segments are to be replaced when their surfaces have been eroded too much. The replacement of the pulley face segments is simpler and less expensive than replacing the belt, and the use of a relatively erodable pulley face prolongs the life of the belt.

9 Claims, 14 Drawing Figures

U.S. Patent  Sep. 8, 1987  Sheet 1 of 3  4,692,128
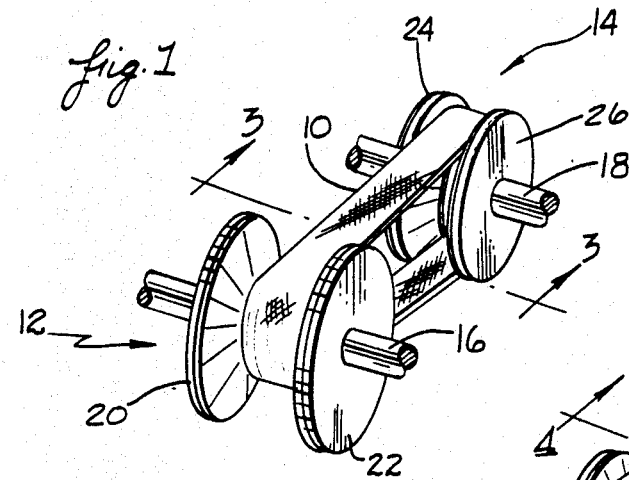
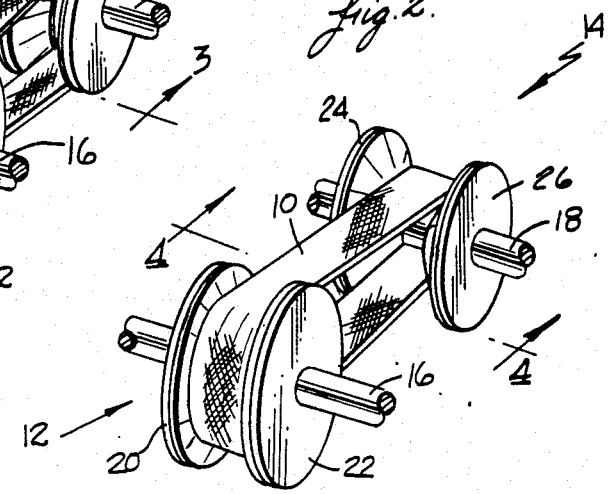
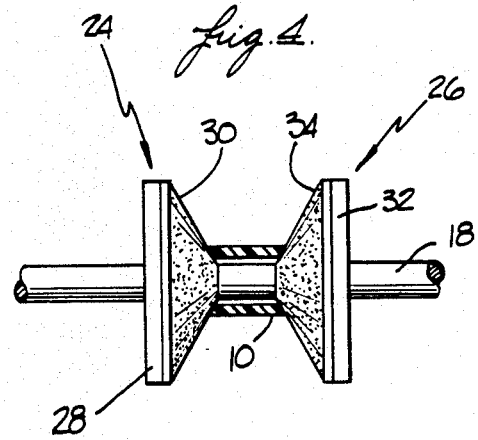
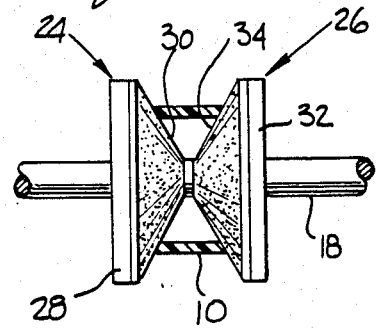
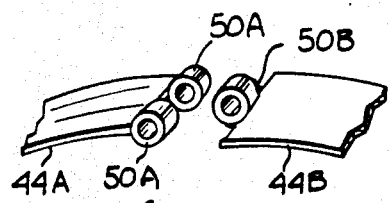
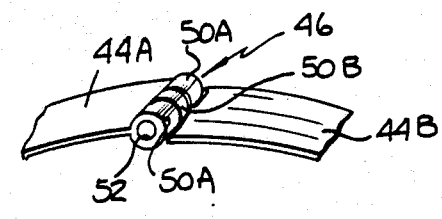

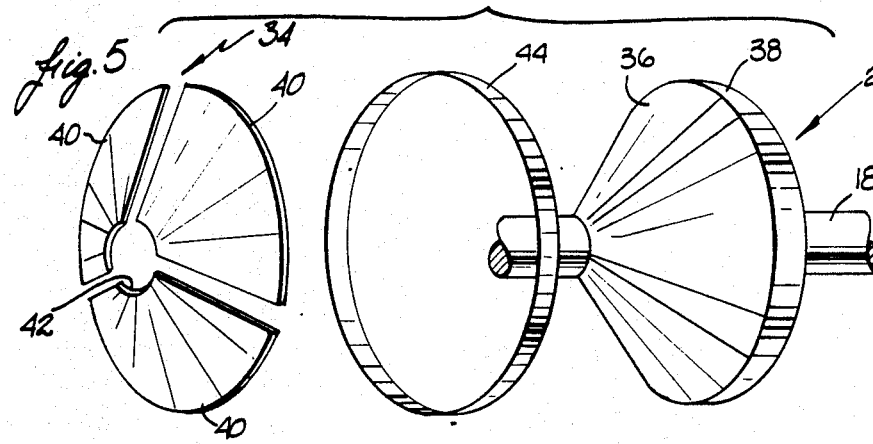
fig.5
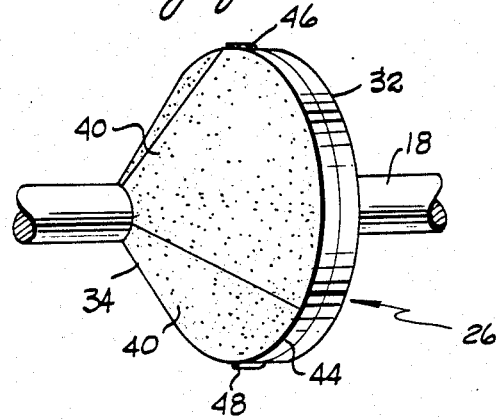
fig.6
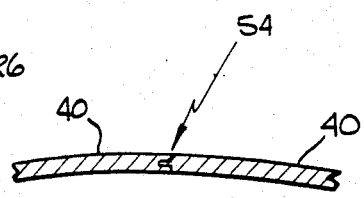
fig.5A
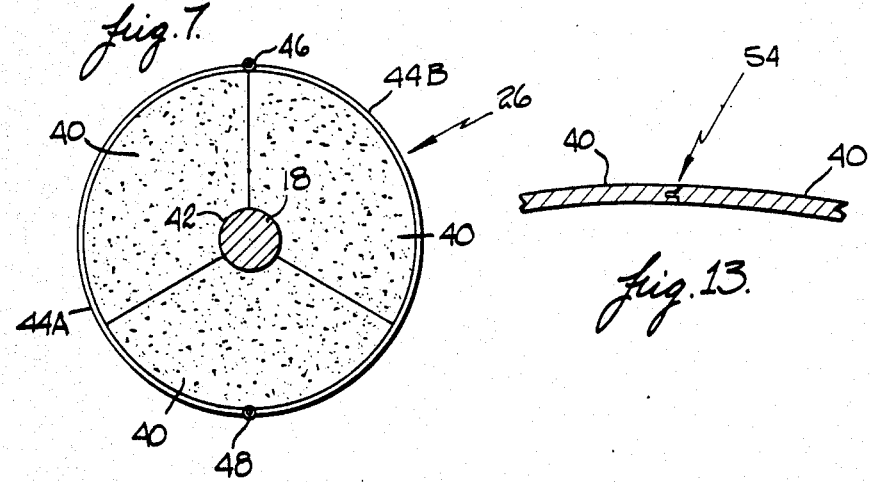
fig.7
fig.13

CONTINUOUSLY VARIABLE TRANSMISSION PULLEY

FIELD OF THE INVENTION

This invention relates to a pulley adapted for use in a continuously variable transmission, and more particularly it relates to a pulley designed to provide longer life to the drive belt.

BACKGROUND OF THE INVENTION

Continuously variable transmissions have been in use for years, mainly where horsepower requirements are relatively low, such as in snowmobiles and lawn mowers. Because of the advantages they offer in fuel economy over that of power gear transmissions, inroads into the automotive market have been predicted for some time. Although still the object of extensive development projects, continuously variable transmissions have not lived up to their promise in the automotive market. Efforts to develop a traction drive, which transmits power from one rolling element to another, have not been successful due to problems with low durability and limited power capabilities. Belt and pulley drive systems offer more hope, but still face difficult problems.

In a belt and pulley drive, the belt moves around a pair of variable diameter pulleys, one of which is mounted on the drive shaft and the other of which is mounted on the driven shaft. Each pulley consists of two pulley halves, one of which is mounted for axial movement toward and away from the other. When one of the split pulleys moves apart, the belt rides further down in the V-shaped space between the conical faces of the two halves. At the same time the other split pulley closes, causing the belt to ride higher in the space between its halves. By connecting the movable pulley halves to a control unit, the pulleys in effect are always changing size, thereby constantly changing the speed ratio to permit optimal fuel consumption. This is not possible in conventional transmissions because they are limited to the few discrete gear ratios provided.

A main problem area still to be resolved is that of belt design. Rubber belts are preferred by some because of their low cost, their relative ease of replacement compared to metal belts, and the fact that they can be run dry as compared to steel belts which must be immersed in an oil bath. Their main drawback, however, is lack of durability. They are subject to fatigue failure caused by cyclical forces to which they are exposed and are also subject to fatigue failure caused by excess tension, resulting from attempts to prevent slippage between the belt and the pulleys.

Metal belts are favored by others because of their increased power capabilities, despite their higher cost and lower efficiency. One design, for example, is a type of matal chain having links, much like in a bicycle chain, enabling it to be installed over the pulleys. Drive pins protrude from the sides of the chain and provide the necessary frictional contact between the chain and the pulleys.

In either case, the belt is subject to wear from its constant driving contact with the pulleys and as a result is subject to eventual failure. The replacement cost of a belt is relatively high, more so for a metal belt, and the cost of the installation labor can be quite significant. Moreover, failure of the drive belt while on the road would be totally disabling, since it is unlikely that the driver would have a spare belt on hand or be able to install it himself if he did have one.

What is needed is an improved arrangment which lessens the likelihood of drive belt failure and is not itself expensive. It would be desirable in addition to have such an arrangement which increases the coefficient of friction between the belt and the pulley, thereby eliminating the need for excessive belt tension as a means for providing adequate driving contact between the belt and the pulleys.

BRIEF SUMMARY OF THE INVENTION

This invention provides pulleys having replaceable belt engaging face portions or wear pads comprised of a material which is relatively erodable as a result of its operative contact with the belt. The face portions are removable attached to the base portions of the pulleys by simple attachment means which enable the face portions to be quickly and inexpensively replaced. The face portions are comprised of a plurality of segments which when held in place on the pulley base form a conical surface over which the belt rides.

As a result of this arrangement, the problem of belt durability can be alleviated by the simple means of selecting an appropriate pulley surface which will provide adequate frictional engagement with the belt without causing undue belt wear or fatique.

Other features and aspects of the invention, as well as their benefits, will be made clear in the more detailed description of the invention which follows.

BRIEF DESCRIPTION OF THE DRAWINGS

FIG. 1 is a pictorial representation of a typical belt and puley arrangement used in a continuously variable transmission, showing the pulleys in a condition corresponding to low gear;

FIG. 2 is a pictorial representation corresponding to that of FIG. 1, but showing the pulleys in a condition corresponding to high gear;

FIG. 3 is a sectional view taken on line 3—3 of FIG. 1;

FIG. 4 is a sectional view taken on line 4—4 of FIG. 2;

FIG. 5 is an exploded pictorial view of a pulley half, showing the components thereof;

FIG. 5A is an exploded pictorial view of two of the pulley face segments, the edge portions being shown in section to illustrate the layered formation of the segments;

FIG. 6 is a pictorial representation of the pulley half of FIG. 5, showing the pulley face segments in place;

FIG. 7 is an end view of the pulley half of FIG. 6, with the shaft shown in section;

FIG. 8 is an enlarged partial view of the ends of a typical band clamp arrangement;

FIG. 9 is an enlarged partial view of the clamp ends of FIG. 8 shown in their engaged position;

FIG. 13 is an enlarged partial sectional view of adjacent face segments, showing the joint therebetween.

DESCRIPTION OF THE INVENTION

Figure 10:
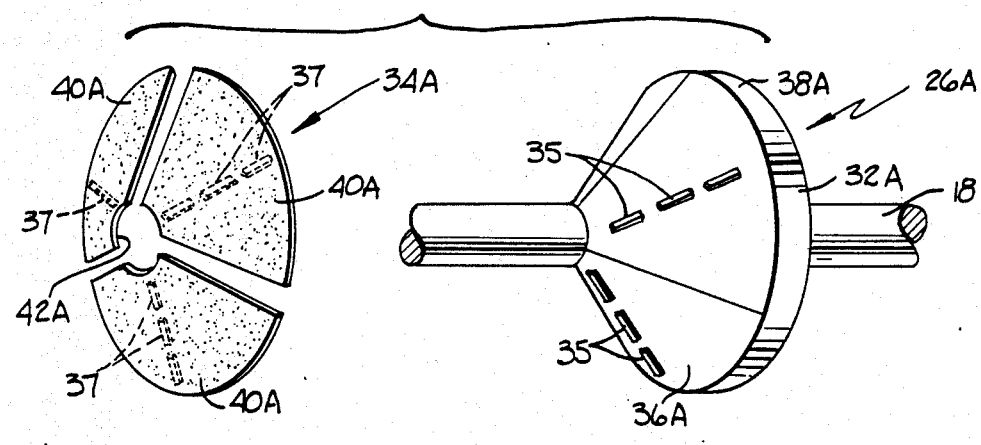
FIG. 10 is an exploded pictorial view similar to that of FIG. 5, but showing a modified attachment arrangement.

Referring to FIG. 1 of the drawing, belt 10 is shown trained about pulleys 12 and 14. Pulley 12 is mounted on drive shaft 16 and pulley 14 is mounted on driven shaft 18, so that upon rotation of drive shaft 16 by motor means, not shown, the driven shaft 18 is thereby caused to rotate by the belt and pulley arrangement.

The pulley 12 is comprised of pulley halves 20 and 22 mounted for relative axial movement along shaft 16. In normal practice, only one of the halves is mounted for movement, the other half being fixed in place on the shaft. The means for moving the slidably mounted pulley half is not shown, as such means are well known in the art and do not form a part of the present invention. In like manner, pulley 14 is comprised of pulley halves 24 and 26 mounted for relative axial movement along shaft 18. As can be seen, the pulley halves 20 and 22 are widely separated from each other, causing the belt 10 to ride down their conical surfaces until it is trained about a relatively small radius. As shown in FIGS. 1 and 3, the pulley halves 24 and 26 are close to each other, causing the belt to ride up their conical surfaces until it is trained about a relatively large radius. In this position the power transmission is comparable to that of low gear.

In FIG. 2, the pulley arrangment has been reversed. The pulley halves 20 and 22 on the drive shaft 16 have moved together and, as also shown in FIG. 4, the pulley halves 24 and 26 on the driven shaft 18 have moved apart, causing the belt 10 to ride up the conical surfaces of pulley halves 20 and 22 and down the conical surfaces of pulley halves 24 and 26. In this condition the belt 10 is trained about a relatively large radius at pulley 12 and, as shown in FIG. 4, about a relatively small radius at pulley 14, the power transmission thus being comparable to high gear.

The description thus far of the structure shown in FIGS. 1 to 4 has been that of a conventional belt and pulley continuously variable transmission. Referring again to FIGS. 3 and 4, however, it can be seen that pulley half 24 is comprised of two parts, a base portion 28 and a belt engaging face portion 30. Similarly, pulley half 26 is comprised of a base portion 32 and a face portion 34. The face portions 30 and 34 are formed of material which is relatively erodable to the extent that over a period of operating time the face portions will erode to a greater extent than will the belt 10. At some point during the life of the transmission the face portions will thus need to be replaced, but the belt at such time will not have to be replaced. This is more economical than replacing the belt because the thin face portion is relatively inexpensive and, as will be made clear hereinafter, the job of replacing the pulley face is simple and not time consuming. In addition to the difference in the rates of erosion of the belt and the pulley face, the friction between the belt and the conical pulley face of this invention is greater than it is between the belt and the usual type of metal pulley face, thus eliminating the need to run the belt at excessively high tension in order to improve the grip between the belt and the pulley face. Although the belt is shown in the drawing for purpose of illustration as being a rubber belt, obviously, in accordance with the foregoing, it could just as well have been shown as a metal belt. While the erosion rate of the pulley face would be greater when a metal belt is used than when a rubber belt is used, the principles involved are the same and the same benefits and advantages would accrue in either case.

The material of the pulley face can be any kind that meets the criteria set forth above. For example, it may consist of an erodable facing material or pad adhered to a backer plate by suitable adhesive commonly referred to as backer stock. The erodable material can be comprised of many different materials or combinations of materials, but in general it includes a minor amount of a friction modifier, a greater amount of an inorganic component and a major amount of an organic component. The organic component functions as a binder and typically would consist of a natural or synthetic rubber and a phenolic resin. The inorganic component is used primarily as a filler and typically could be alumina, barytes, silica, iron oxides, and the like. The friction modifier consists of inorganic materials which substantially affect the friction properties of the composition. Typically they are minerals or ceramics having a Mohs hardness of greater than 5, examples being silicon carbide, zircon, garnet and iron chromite. Also, metal grit can be used, which is a material composed of granules or hard metal such as scrap cast iron. More detailed information on erodable friction material can be found in the literature on composition brake shoes, of which U.S. Pat. Nos. 4,178,278, 4,352,750 and 4,371,631 are examples.

Referring to FIG. 5, which shows an exploded view of the pulley half 26, the pulley base 32 comprises a conical portion 36 connected to a disc portion 38, the entire unit having a central opening therethrough to receive the shaft 18. Adapted to fit over the conical portion 36 are wear pads or segments 40 which when in place comprise the pulley face portion 34. As shown in FIG. 5A, each segment 40 typically consists of a layered structure comprising the outer erodable wearing surface 40A, a metal backer plate 40C and a layer of backer stock 40B. The backer stock functions to bond the wear surface composition to the backer plate 40C. This is a typical arrangement used to bond friction material to a backer plate since the friction material does not easily bond directly to the backer plate. The details of the bonding of the friction material to the backer plate are well known in the art of composition friction materials and do not form a part of the present invention. For more information on this subject U.S. Pat. No. 4,371,631 and the patents cited therein may be consulted.

Referring back to FIG. 5, the surface of each segment corresponds to the part of the conical portion 36 which the segment is intended to cover so that when the segments are in place they form a continuous conical surface. The narrow tips 42 of each segment 40 are arcuate and when the segments are in place the tips form an opening through which the shaft 18 can extend. Although three segments are shown, the exact number of segments utilized is not critical so long as there are at least two, to allow the segments to be assembled over the shaft, and not so many that difficulties in holding them in place are thereby introduced. In order to keep the seams between the segments at a minimum, it is preferred that no more than four be utilized. In addition, means to secure the segments 40 to the base portion 32 are provided. One of the simplest of many possible methods of joining the segments is shown as comprising a ring or band 44 adjacent the juncture of the disc portion 38 and the conical portion 36, the details of which are described more fully below.

Referring to FIGS. 6 and 7, the components of FIG. 5 are shown in assembled condition. The continuous surface formed by the joined segments 40 forms the conical belt engaging face portion 34 of the pulley half 26, and the segments are held in place on the base portion 32 by the band 44. As shown in FIG. 7, the band 44 is actually comprised of two separate bands, 44A and 44B, connected to each other at 46 and 48. Although the design of the specific fastening means can vary as desired, it is preferred that the fastener be provided in separate sections, as illustrated by band sections 44A and 44B, so that when assembled the connecting points 46 and 48 are symmetrically arranged around the circumference of the pulley half. This provides the proper balance needed during operation. In practice, it is preferred that only two clamp sections be employed in order to avoid difficulties in maintaining the proper balance when replacing the pulley segments.

Referring to FIG. 8, the end portions of clamp bands 44A and 44B are shown, each having enlarged spaced tubular knuckles 50A and 50B. The knuckles of one band fit into the gaps between the knuckles on the other band and, as shown in FIG. 9, a pin 52 fits through the tubular knuckles of the bands to hold the band in place and to form the clamp connection 46. Suitable means, such as a clamp similar to an enlarged hose clamp or an enlarged chuck of the type used to hold a drill bit could be used to strap the bands tightly in place and to hold them secure while the pins are inserted.

Figure 11:
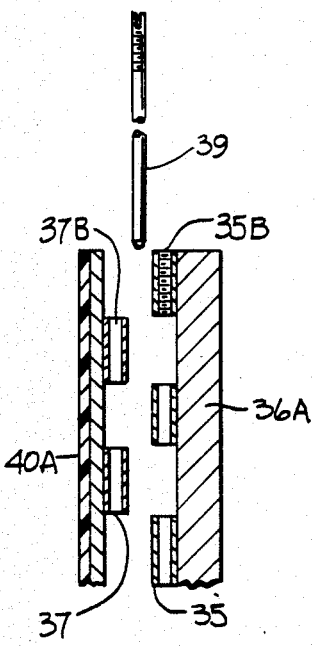
FIG. 11 is a partial sectional view taken through the lugs of a pulley face segment of FIG. 10 and through the complementary lugs on the pulley base portion.
Figure 12:
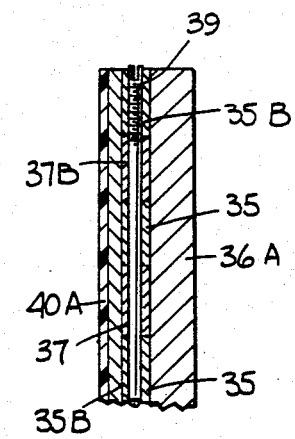
FIG. 12 is a view similar to that of FIG. 11, but showing the pulley face segment and pulley base portion in engaged condition.

Another type of attachment means is shown in FIGS. 10, 11 and 12. Referring first to FIG. 10, as in the structure described in connection with FIG. 5, the pulley base 32A of pulley half 26A has a conical portion 36A connected to disc portion 38A, the entire unit having a central opening through which the shaft 18 extends. In addition, the conical portion has a series of spaced lugs 35 on its surface arranged to be in alignment with the spaces between lugs 37 depending from the underside of the segments 40A which make up the pulley face portion 34A. Thus, although not shown, the conical surface 36A would have three series of lugs in order to have them aligned with the lugs 37 on each of the three segments 40A. Obviously, if a greater or lesser number of segments were used, the number of series of lugs 35 would be adjusted accordingly.

Referring now to FIG. 11, this sectional view shows the conical portion 36A and a segment 40A spaced from each other so that the lugs of one are aligned with the spaces between the lugs of the other. Each lug 37 has an opening 37B extending therethrough and each lug 35 similarly has an opening 35B extending therethrough. When the conical portion 36A and segment 40A are moved into contact with each other so that the lugs of one member fit into the spaces between the lugs on the other member, the openings 35B and 37B are in alignment as shown in FIG. 12. In this position a pin 39 can be inserted through the aligned openings and the pin held in place to secure the segments to the conical portion 36A. One way of accomplishing this is to make the openings 35B and 37B threaded and to use a screw as the pin 39. In this way the conical portion and the segments would be positively secured to each other and the head of the screw could be recessed so as not to interfere with any of the pulley structure.

As mentioned, any satisfactory means for holding the pulley segments in place can be used, and the invention is not limited to the particular attachment means described above, which have been presented by way of example only.

Referring to FIG. 13, adjacent face segments 40 may be provided with male and female configurations respectively, as shown at 54, to permit the male edge of one segment to fit into the female edge of the adjacent segment. This arrangement assists in holding the segments in proper alignment and promotes a snug edge seam which is needed to make the outer surface of one segment continuous with that of the next segment. Obviously, other edge seam or joint designs could be used, so long as the segments have a continuous outer conical surface and are not subject to slippage on the pulley base. Although FIG. 13 shows segments 40 in connection with this arrangment, obviously segments 40A could also be treated in like manner.

It should now be clear that the present invention provides a simple yet effective solution to the problem of belt durability in a belt and pulley continuously variable transmission, and does so in a very inexpensive manner. The invention enables the wear pads or pulley face segments to be replaced whenever it appears necessary and minimized the risk of the drive belt failing.

It should be understood that although a preferred ambodiment of the invention has been described, it is possible to make changes to certain specific details of the preferred embodiment without departing from the spirit and scope of the invention.

What is claimed is:

1. In a power transmission arrangment having a drive shaft, a pulley mounted on the drive shaft, a driven shaft, a pulley mounted on the driven shaft, and a drive belt trained over and operatively connecting the pulleys, the improvement comprising:

each pulley having a base portion and a belt engaging face portion;

each belt engaging face portion comprising a plurality of connecting segments, having wear surfaces which together are forming a conical surface, the wear surfaces of said segments being comprised of a composition including friction modifying material which will erode to a greater extent than the belt as a result of its operative contact with the belt; and means for removable attaching the face portions of the puleys to the base portions thereof.

2. A power transmission arrangement according to claim 1, wherein the means removably attaching the segments of a face portion to the corresponding pulley base portion comprises a clamp band encircling the base portion and clamping the segments thereagainst.

3. In a continuously variable power transmission arrangment having a drive shaft, a pulley on the drive shaft including two pulley halves mounted for relative axial movement toward and away from each other, a driven shaft, a pulley on the driven shaft including two pulley halves mounted for relative axial movement toward and away from each other, and a drive belt trained over and operatively connecting the pulleys, the improvement comprising:

each pulley half having a base portion and a belt engaging face portion, each face portion comprising a conical surface;

the face portions of the pulley halves being comprised of a material which as a result of its operative contact with the belt will erode to a greater extent than will the belt; and means for removably attaching the face portions of the pulley halves to the base portions thereof.

4. A continuously variable power transmission arrangment according to claim 3, wherein the wear surface of the face portions of the pulley halves is comprised of a composition including friction modifying material having a Mohs hardness greater than 5.

5. A continuously variable power transmission arrangment according to claim 3, wherein each belt engaging face portion comprises a plurality of connected segments, the wear surfaces of the segments together forming the conical surface of the face portion.

6. A continuously variable power transmission arrangment according to claim 5, wherein the connected segments have contiguous side edges, the side edges of adjacent segments fitting together to form a joint, the outer surface of each segment adjacent the joint being a continuation of the outer surface of the adjacent segment.

7. A continuously variable power transmission arrangement according to claim 5, wherein each segment is shaped so that the connected surfaces of the segments form a central circular opening through which the associated shaft extends.

8. A continuously variable power transmission arrangement according to claim 5, wherein the means for removably attaching the face portions of the pulley halves to the base portions thereof comprises a clamp band encircling each base portion and clamping the segments thereagainst.

9. A continuously variable power transmission arrangement according to claim 5, wherein the means for removable attaching the face portions of the pulley halves to the base portions thereof comprises a plurality of lugs extending from the underside of each segment and from the outer surface of the base portion, the lugs of the segments and the base portion interfitting with each other and being held together by a pin extending through aligned openings in the lugs.

* * * * *